US012377911B2

(12) United States Patent
Cho (10) Patent No.: US 12,377,911 B2
(45) Date of Patent: Aug. 5, 2025

(54) ONE-SIDE BRAKE CONTROL SYSTEM AND CONTROL METHOD OF DISTRIBUTING TORQUES BETWEEN FRONT AND REAR WHEELS TO PERFORM ONE-SIDE BRAKE

(71) Applicant: HL MANDO CORPORATION, Gyeonggi-do (KR)

(72) Inventor: Youngeun Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 27 days.

(21) Appl. No.: 18/375,459

(22) Filed: Sep. 30, 2023

(65) Prior Publication Data
US 2024/0308585 A1   Sep. 19, 2024

(30) Foreign Application Priority Data

Mar. 16, 2023   (KR) .......................... 10-2023-0034464

(51) Int. Cl.
*B62D 9/00*  (2006.01)
*B60T 7/12*  (2006.01)
(Continued)

(52) U.S. Cl.
CPC .............. *B62D 9/005* (2013.01); *B60T 7/12* (2013.01); *B60T 8/171* (2013.01); *B60T 8/172* (2013.01);
(Continued)

(58) Field of Classification Search
CPC . B62D 9/005; B60T 7/12; B60T 8/171; B60T 8/172; B60T 8/246; B60T 8/26;
(Continued)

(56) References Cited

U.S. PATENT DOCUMENTS

2013/0253793 A1   9/2013  Lee et al.

FOREIGN PATENT DOCUMENTS

JP   2009126388 A  *  6/2009

OTHER PUBLICATIONS

Office Action dated May 20, 2025 for Korean Patent Application No. 10-2023-0034464 and its English translation provided by Applicant's foreign counsel.

* cited by examiner

*Primary Examiner* — Jacob M Amick
*Assistant Examiner* — Charles J Brauch
(74) *Attorney, Agent, or Firm* — WOMBLE BOND DICKINSON (US) LLP (57) ABSTRACT

A one-side brake control system and method perform distribution of torques between front and rear wheels. The one-side brake control system includes a target steering angle input unit to which a target steering angle of a driver or a controller of an autonomous vehicle is input when a steering system fails, an integrated Electronic Control Unit (ECU) configured to calculate a target moment of the vehicle according to the target steering angle input through the target steering angle input unit and calculate brake torques of a one-side front wheel and a one-side rear wheel of the vehicle based on the target moment, and a braking ECU configured to control one or more braking actuators of the one-side front wheel and the one-side rear wheel of the vehicle according to the brake torque of the front wheel and the rear wheel transmitted from the integrated ECU to perform one-side brake.

20 Claims, 8 Drawing Sheets

(51) Int. Cl.
    *B60T 8/171* (2006.01)
    *B60T 8/172* (2006.01)
    *B60T 8/24* (2006.01)
    *B60T 8/26* (2006.01)
    *B60T 17/22* (2006.01)

(52) U.S. Cl.
    CPC ............... *B60T 8/246* (2013.01); *B60T 8/26* (2013.01); *B60T 17/22* (2013.01); *B60T 2220/00* (2013.01); *B60T 2260/02* (2013.01); *B60T 2270/10* (2013.01); *B60T 2270/88* (2013.01)

(58) Field of Classification Search
    CPC .. B60T 17/22; B60T 2220/00; B60T 2260/02; B60T 2270/10; B60T 2270/88; B60T 8/1755; B60T 8/24; B60T 13/74; B60Y 2306/13; B60Y 2400/81
    See application file for complete search history.

ONE-SIDE BRAKE CONTROL SYSTEM AND CONTROL METHOD OF DISTRIBUTING TORQUES BETWEEN FRONT AND REAR WHEELS TO PERFORM ONE-SIDE BRAKE

CROSS REFERENCE TO RELATED APPLICATION(S)

This application claims the priority to and the benefit of Korean Patent Application No. 10-2023-0034464, filed on Mar. 16, 2023 which is all hereby incorporated by reference in its entirety.

TECHNICAL FIELD

The present disclosure generally relates to a one-side brake control system and a one-side brake control method, and more specifically, a one-side brake control system and a one-side brake control method of distributing brake torques between a one-side front wheel and a one-side rear wheel during an operation of one-side brake to achieve efficient one-side brake.

BACKGROUND

Until now, steering and braking technologies in automobiles have been mainly achieved by mechanical systems. When a driver applies physical force, such as moving a steering wheel or stepping on brakes, an automobile converts the force into mechanical kinetic energy.

As a next-generation vehicle technology, a "By-Wire" technology is actively being developed. In the field of automobiles, the "By-Wire" technology is emerging as an element that will cause a great change in an automobile manufacturing technology as it is mainly applied and developed in the fields of a steering system and a braking system.

In the field of steering systems, a "Steer-by-Wire" technology is being developed, which uses electric power such as a motor or sensor to steer a vehicle without mechanical connection between a steering wheel and a road wheel. When the Steer-by-Wire technology is applied, a steering column, which was a central axis of a conventional steering system, is not needed, so it is much easier to turn the wheel left and right, and the risk of injury to the driver in the event of a collision can be greatly reduced by electronic steering.

In the field of braking systems, it is applied as a "Brake-by-Wire" technology that can replace a conventional hydraulic control system with an electric control system, and can actively control the brakes of the four wheels independently.

However, in By-Wire products, since adjustment of a driver and chassis products are only electrically connected, when there is an error or abnormality in the By-Wire system, there is no way for the driver to control the vehicle. Therefore, there is a demand for a backup device that can compensate for a failure of a By-Wire product.

In particular, in the case of a Steer-by-Wire steering system, 100% of steering performance may be lost when a communication problem occurs and a steering operation of the driver or a target steering signal of an autonomous vehicle is not transmitted to an actuator. Since this can lead to a serious accident, the need for a redundancy function in a steer-by-wire steering system is more urgently required.

For example, when a steering device in the Steer-by-Wire steering system fails during autonomous traveling, the vehicle can urgently move to a shoulder of the road or the like by using one-side brake performed on one-side tire.

When the one-side brake is performed on one side of a rear wheel while traveling on a low-curvature road, a rotational force in which wheels to which brake pressure are not applied among four wheels rotates around one of the rear wheels to which the brake pressure is applied may be generated. Due to the rotational force generated in this way, steering control for changing lanes in the direction of the shoulder of the road can be performed while a failure of the steering device.

However, in the case that the one-side brake is generated only for one or more specific wheels when the Steer-by-Wire system fails or is in an abnormal state, it may be difficult of performing stable steering because various phenomena occurring in the vehicle cannot be considered during one-side brake. When a one-side brake force is applied to the vehicle, a moment may be generated in the vehicle, but a pitch phenomenon (a phenomenon in which the center of gravity moves forward) may also occur, and therefore a wheel slip phenomenon may occur, and these phenomena may need to be considered for the stable steering.

SUMMARY

Some of embodiments of the present disclosure aim to provide a one-side brake control system and a one-side brake control method using distribution of torques between front and rear wheels, which can perform stably one-side brake on a vehicle and perform emergency steering when a steering system of a vehicle fails.

According to an aspect of the present disclosure, there is provided a one-side brake control system using distribution of torque between front and rear wheels, the one-side brake control system including: a target steering angle input unit to which a target steering angle of a driver or an autonomous vehicle is input when a steering system fails; an integrated ECU configured to calculate a target moment of a vehicle according to the target steering angle input through the target steering angle input unit and calculate brake torques of one-side front wheel and one-side rear wheel of the vehicle according to the target moment; and a braking ECU configured to control a braking actuator of one-side front wheel and one-side rear wheel of the vehicle according to the brake torque values of the front wheel and the rear wheel transmitted from the integrated ECU to perform one-side brake.

A brake pressure of the rear wheel may be limited to a specific pressure.

When the brake pressure of the rear wheel reaches the limit pressure, an additional one-side brake force may be generated only by the brake torque of the front wheel.

Until the brake pressure acting on the rear wheel reaches the limit pressure, the brake torque of the rear wheel may be set to be smaller than the brake torque of the front wheel and the brake pressure of the rear wheel and the brake pressure of the front wheel may be set to be the same.

After the limit pressure of the rear wheel, when a one-side brake torque larger than a maximum pressure of the front wheel is required, the limit pressure value of the rear wheel may be set high.

The integrated ECU may receive steering failure information from a steering ECU.

The limiting pressure of the rear wheel may be set to a brake pressure applied to the rear wheel in a state immediately before slip occurs in the rear wheel after braking starts while the vehicle is traveling at a specific speed in a specific road surface condition.

A limit pressure value of the rear wheel may be automatically set through monitoring in a process in which the braking starts and the slip occurs in the rear wheel, or the limit pressure of the rear wheel may be arbitrarily set to a specific value by a setter.

The integrated ECU may calculate the one-side brake force using the calculated target moment of the vehicle, calculate a total brake pressure using the one-side brake force and front and rear wheel torque factors, and calculate the front and rear wheel brake torques using the total brake pressure and the front and rear wheel torque factors.

According to another aspect of the present disclosure, there is provided a one-side brake control method using distribution of torque between front and rear wheels, the one-side brake control method including: receiving a target steering angle of a driver or an autonomous vehicle when a steering system fails and calculating a target moment of a vehicle according to the target steering angle; and calculating brake torques of one-side front wheel and one-side rear wheel of the vehicle according to the target moment, and then controlling a braking actuator of one-side front wheel and one-side rear wheel of the vehicle according to the brake torque values of the front wheel and the rear wheel to perform one-side brake.

The one-side brake control method may further include: (a) determining whether one-side brake control is necessary when the steering system fails; (b) calculating the target moment of the vehicle when the one-side brake control is necessary; (c) calculating a one-side brake force; (d) calculating a total brake pressure; (e) calculating the brake torques of the front and rear wheels; and (f) distributing the brake torques to the front and rear wheels.

The one-side brake control method may further include (g) setting a limit pressure of the rear wheel before the step (f).

In the step (a), it may be determined whether the steering system fails in the integrated ECU through whether a failure signal is transmitted from the steering ECU to the integrated ECU or whether communication between the integrated ECU and the steering ECU is disconnected, and it may be determined whether the one-side brake control is necessary in the integrated ECU according as whether the target steering angle is input through a target steering angle input unit.

In the step (c), the one-side brake force may be calculated by the following Equation.

One-side brake force=vehicle target moment/(vehicle width/2)

In the step (d), the total brake pressure of the vehicle may be calculated by the following Equation.

Total brake pressure=one-side brake force/(front wheel torque factor+rear wheel torque factor)

The front wheel torque factor and the rear wheel torque factor may be calculated by the following Equation.

Torque factor=friction coefficient×(pressure/$A$)×$R$× number of pistons×number of wheels The front and rear wheel brake torques may be calculated by the following Equation.

Front wheel brake torque=total brake pressure×front wheel torque factor

Rear wheel brake torque=total brake pressure×rear wheel torque factor

The step (f) may include comparing the rear wheel brake torque and a rear wheel limit torque (rear wheel brake torque when the rear wheel is the limit pressure).

In the step (f), when the rear wheel brake torque is smaller than the rear wheel limit torque, the rear wheel brake torque applied to the rear wheels may be a value obtained by multiplying the total brake pressure by the rear wheel torque factor.

In the step (f), when the rear wheel brake torque is the rear wheel limit torque or more, the rear wheel brake torque applied to the rear wheels may be a rear wheel limit torque.

In the step (f), when the rear wheel brake torque is the rear wheel limit torque or more, the front wheel brake torque applied to the front wheel may be calculated by the following Equation.

Front wheel brake torque=total brake pressure×(front wheel torque factor+rear wheel torque factor)− rear wheel limit torque According to some embodiments of the present disclosure, a one-side brake control system and one-side brake control method may perform the distribution of the brake torques between the front and rear wheels when the target steering angle is input to steer the vehicle in an emergency when the steering system fails, automatically calculate the target moment of the vehicle, automatically calculate appropriate brake torques for the front and rear wheels on one side of the vehicle according to the target moment and applied to the front and rear wheels, and thus, the vehicle can be stably steered by one-side brake.

In addition, according to certain embodiments of the present disclosure, by setting a value for limiting a brake pressure on the rear wheel, it is possible to prevent a slip phenomenon and unnecessary brake force applied to the rear wheel.

DETAILED DESCRIPTION

Hereinafter, a one-side brake control system and a one-side brake control method using distribution of torques between front and rear wheels according to a preferred embodiment of the present disclosure will be described in detail with reference to the accompanying drawings.

Figure 1:
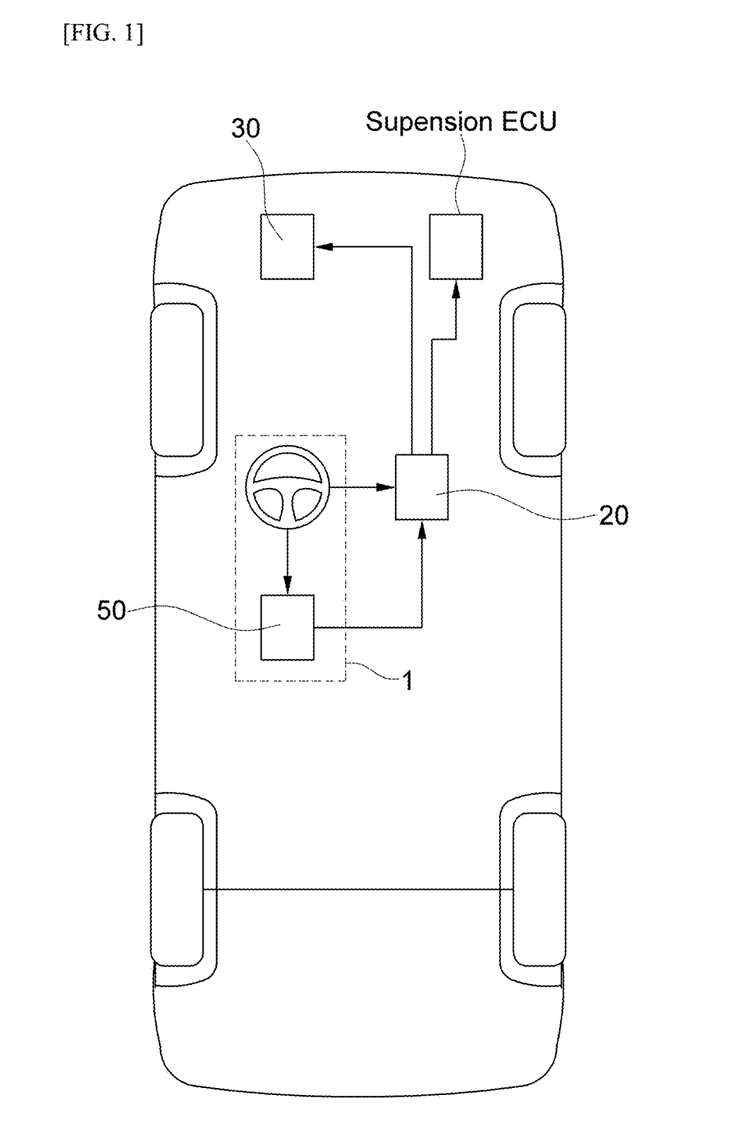
FIG. 1 is a conceptual diagram for schematically illustrating a vehicle comprising a one-side brake control system using distribution of torques between front and rear wheels according to an embodiment of the present disclosure.
Figure 2:
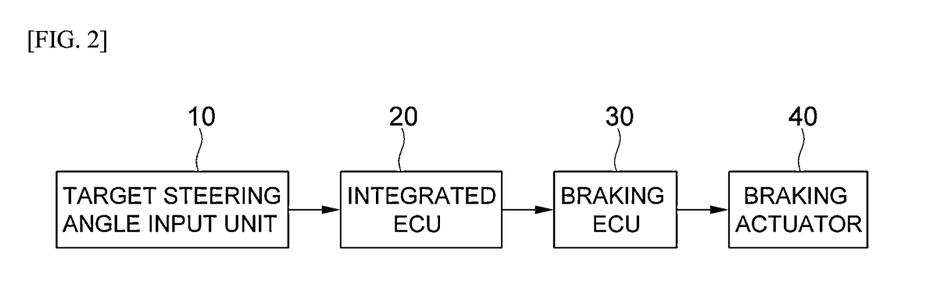
FIG. 2 is a block diagram for illustrating a one-side brake control system using the distribution of torques between front and rear wheels according to an embodiment of the present disclosure.

FIG. 1 is a conceptual diagram for schematically illustrating a vehicle comprising a one-side brake control system using distribution of torques between front and rear wheels according to an embodiment of the present disclosure, and FIG. 2 is a block diagram for illustrating a one-side brake control system using the distribution of torques between front and rear wheels according to an embodiment of the present disclosure.

The one-side brake control system using the distribution of torques between front and rear wheels according to an embodiment of the present disclosure is provided so that a vehicle can urgently change a lane to a shoulder of a road or the like when a steering system 1 configured to control the steering of wheels suddenly fails or is in an abnormal state while the vehicle travels. When the steering system 1 fails or is in an abnormal state, a driver cannot steer or adjust the direction of the vehicle. Therefore, the vehicle can perform emergency-steering by rotating the vehicle in one direction through one-side brake that applies brake force only to one or more wheels located on one side of the vehicle.

The emergency steering of the vehicle can be stably performed by distributing appropriate brake force to the front and rear wheels during the one-side brake of the vehicle. To this end, the one-side brake control system capable of distributing the torques of the front and rear wheels according to a preferred embodiment of the present disclosure may include a target steering angle input unit 10, an integrated Electronic Control Unit (ECU) 20, and a braking ECUs 30. The target steering angle input unit 10 and ECUs may comprise one or more processors and memory configured to store instructions that, when executed by one or more processors, cause one or more processors to perform specific operations, and the ECUs may be, for example, but not limited to, an embedded system in automotive electronics that controls one or more of the electrical systems or subsystems in the vehicle. The target steering angle input unit 10 and the plurality of ECUs may be integrated into one single ECU, and can be implemented as separate ECUs.

The target steering angle is input to the target steering angle input unit 10 to follow a target steering inputted from the driver or a controller or processor of an autonomous vehicle when the steering system 1 fails.

When the driver directly drives the vehicle by oneself, a wheel detection sensor included in the target steering angle input unit 10 may detect the rotation of the steering wheel by the driver to steer the vehicle to the shoulder of the driver or the like in an emergency, and a detection signal representing the amount of the rotation of the steering wheel is transmitted to the integrated ECU 20.

In the case of the autonomous vehicle, the target steering angle input unit 10 acquires the traveling state of the vehicle and various surrounding information from various sensors, transmits the traveling state and the information to a controller, calculates the target steering angle for the emergency steering of the vehicle to the shoulder of the road from the controller, and transmits the target steering angle to the integrated ECU 20.

The integrated ECU 20 may be a main electronic control unit. When the target steering angle is transmitted from the target steering angle input unit 10 to the integrated ECU 20, the integrated ECU 20 processes the target steering angle by performing one or more operations such as vehicle target moment calculation, one-side brake force calculation, total brake pressure calculation, front wheel brake torque calculation, rear wheel brake torque calculation, rear wheel pressure limit setting, and brake torque distribution. The amounts of front and rear wheel brakes calculated by the integrated ECU 20 are transmitted to the braking ECUs 30.

The braking ECUs 30 controls the braking of the front and rear wheels respectively by controlling the operation of the braking actuators 40 which are configured to actuate brakes of the front and rear wheels respectively according to the amounts of front and rear wheel brake torques transmitted from the integrated ECU 20. The braking ECU 30 and the braking actuator 40 may be provided at each wheel.

Meanwhile, the integrated ECU 20 may receive a signal indicating the failure, abnormality or malfunction (herein "failure") of the steering system 1 from the steering ECU 50. The steering ECU 50 identifies difficulty in steering control of the vehicle in response to the signal indicating the failure of the steering system 1 and transmits the information to the integrated ECU 20. In addition, when communication between the integrated ECU 20 and the steering ECU 50 is disconnected or discontinued due to the failure or abnormality of the steering system 1, the integrated ECU 20 can determine that the one side brake of the vehicle needs to be performed because the steering system 1 may have failed or be in an abnormality state.

Figure 3:
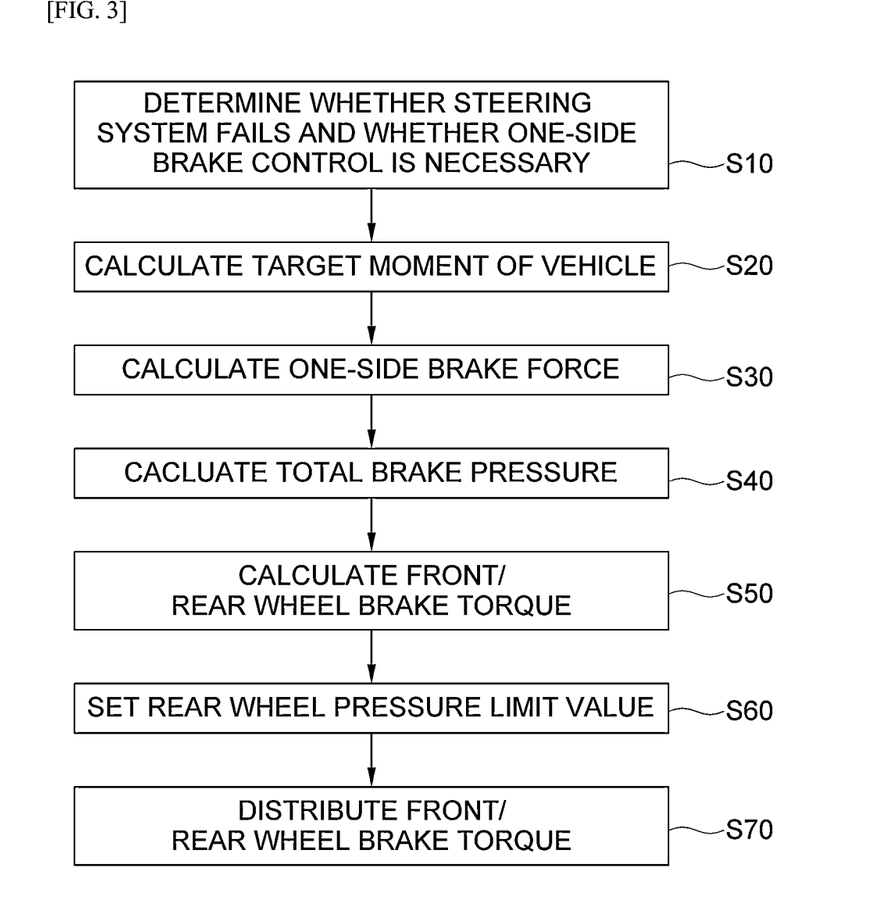
FIG. 3 is a flowchart for illustrating a method of controlling one-side brake by distribution of torques between front and rear wheels according to an embodiment of the present disclosure.
Figure 4:
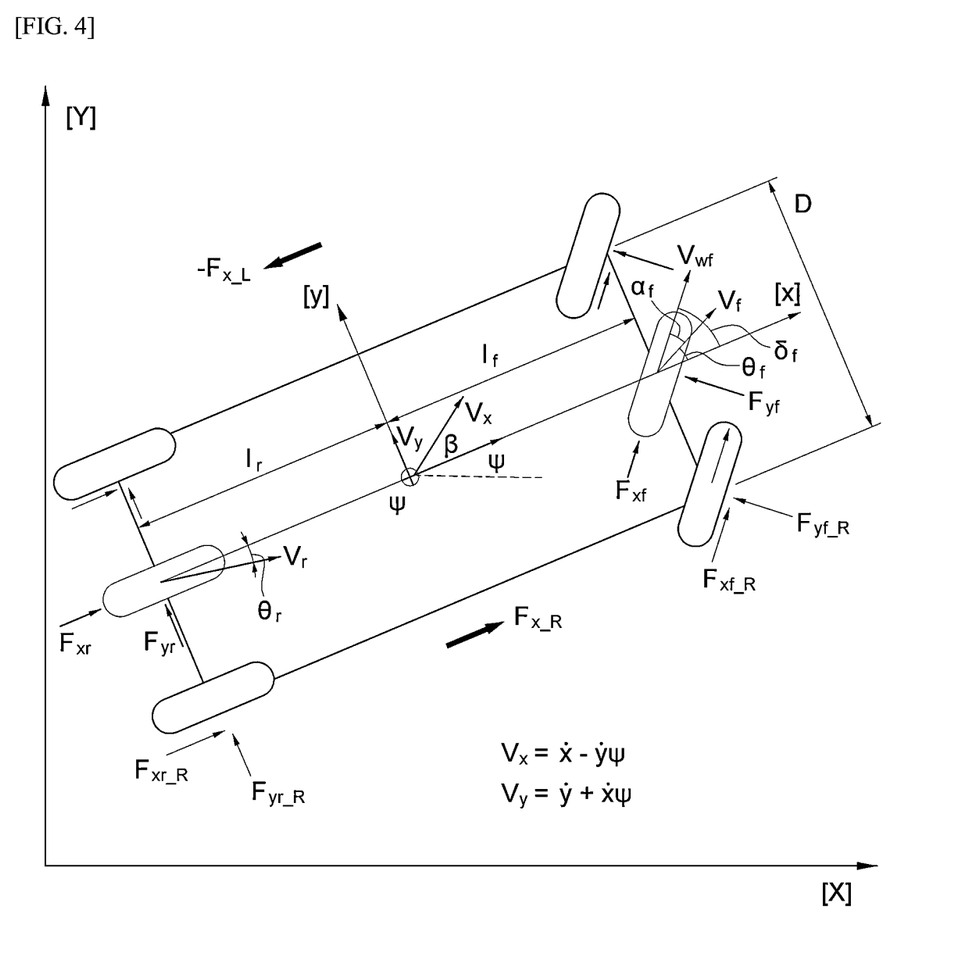
FIG. 4 is a diagram illustrating a lateral behavior of a vehicle.
Figure 5:
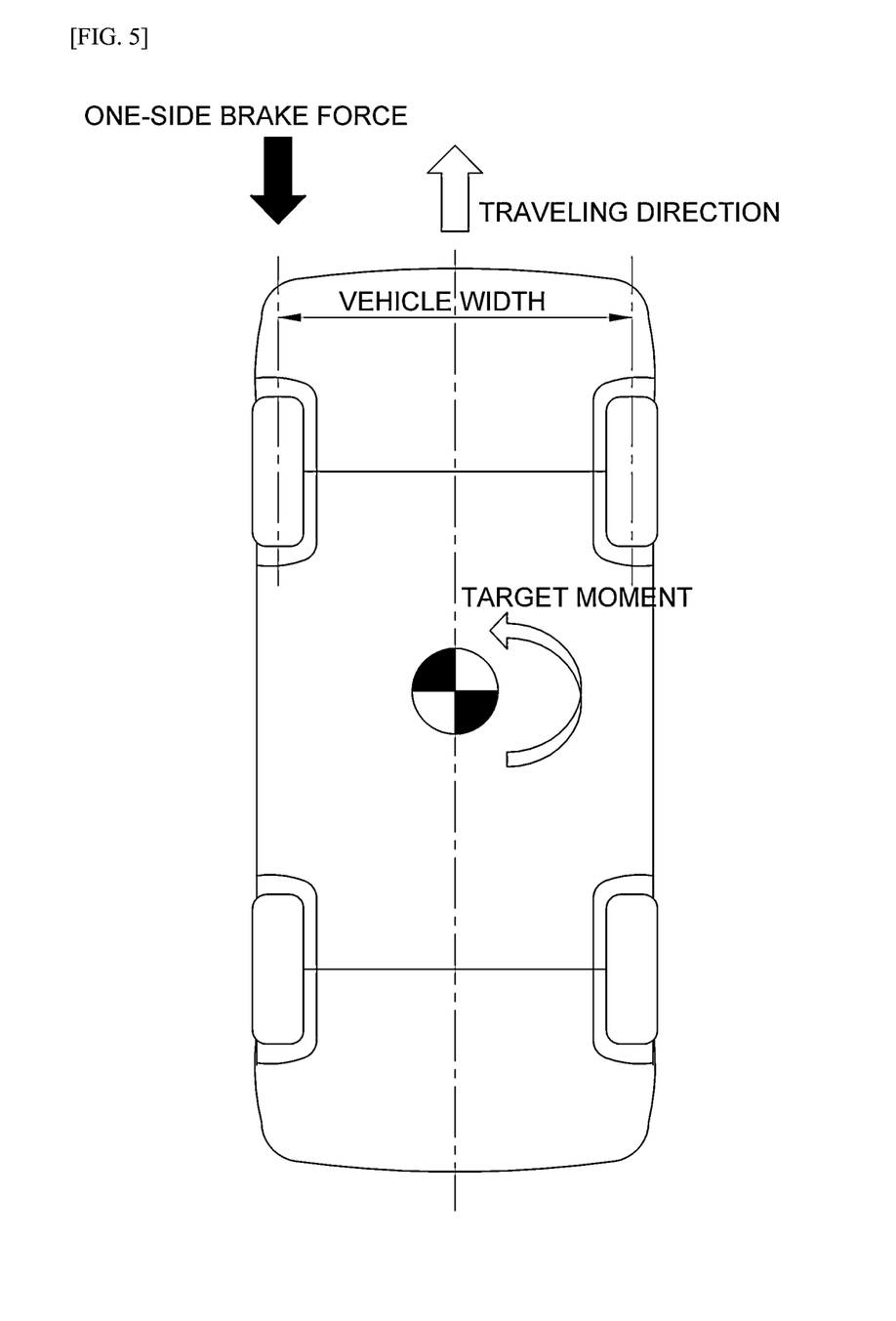
FIG. 5 is a conceptual diagram for illustrating a one-side brake force and a target moment act when a one-side brake force is applied to one side of a vehicle while the vehicle is traveling according to an embodiment of the present disclosure.
Figure 6:
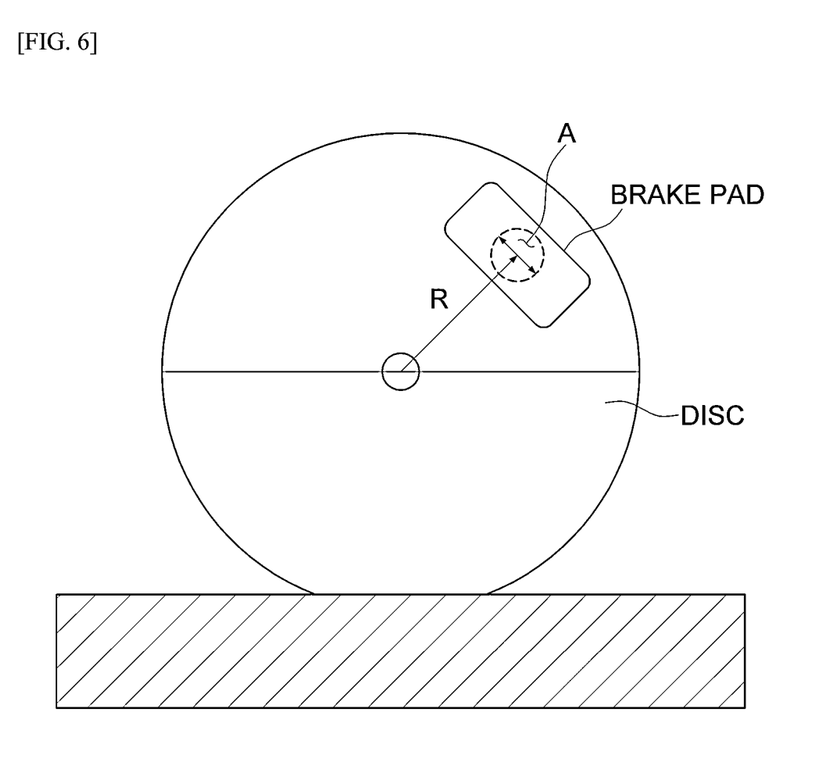
FIG. 6 is a conceptual diagram for schematically illustrating a relationship between a brake disc and a pad of a vehicle according to an embodiment of the present disclosure.

FIG. 3 is a flowchart for illustrating a method of controlling one-side brake by distribution of torques between front and rear wheels according to an embodiment of the present disclosure, FIG. 4 is a diagram illustrating a lateral behavior of a vehicle, FIG. 5 is a conceptual diagram for illustrating a one-side brake force and a target moment act when the one-side brake force is applied to one side of a vehicle while the vehicle is traveling according to an embodiment of the present disclosure, and FIG. 6 is a conceptual diagram for schematically illustrating a relationship between a brake disc and a pad of a vehicle according to an embodiment of the present disclosure.

The one-side brake control method according to an embodiment of the present disclosure includes a one-side brake control necessity confirmation step S10, a vehicle target moment calculation step S20, a one-side brake force calculation step S30, a total brake pressure calculation step S40, a front/rear wheel brake torque calculation step S50, a rear wheel pressure limit value setting step S60, and a front/rear wheel brake torque distribution step S70.

One-Side Brake Control Necessity Confirmation Step (S10)

When the signal indicating the failure or abnormality of the steering system 1 is transmitted from the steering ECU 50 to the integrated ECU 20 or when communication between the integrated ECU 20 and the steering ECU 50 is disconnected or discontinued, the integrated ECU 20 checks whether one-side brake control of the vehicle is required or needs to be performed.

Whether the one-side brake control of the vehicle is required or needs to be performed can be checked based on the target steering angle input through the target steering angle input unit 10. For example, when the target steering angle is input through the target steering angle input unit 10, the integrated ECU 20 can determine that emergency steering needs to be performed through the one-side brake, and when the target steering angle is not input to the target steering angle input unit 10, the integrated ECU 20 can determine that the one-side brake is not required to be performed.

Vehicle Target Moment Calculation Step (S20)

When the target steering angle is input from a driver or an autonomous vehicle controller through the target steering angle input unit 10, the integrated ECU 20 calculates a target yaw moment of the vehicle. A target amount of how much the vehicle should be rotated in order to steer the vehicle in an emergency is calculated by the integrated ECU 20.

The target moment of the vehicle can be calculated using, for example, but not limited to, a 3 degrees of freedom (DOF) lateral vehicle dynamic state space model. An example of the state space model is represented by Equation 1 below, and the appearance of the vehicle during lateral movement is illustrated in FIG. 4.

$$\dot{X} = AX + BU \quad \text{[Equation 1]}$$

$$\frac{d}{dt}\begin{bmatrix} \dot{y} \\ \dot{\Psi} \end{bmatrix} = \begin{bmatrix} \frac{-2C_{ar} + mr_{eff}\dot{\omega}_w}{m\dot{x}} & \frac{2C_{ar}l_r - m\dot{x}^2 + mr_{eff}\dot{\omega}_w l_f}{m\dot{x}} \\ \frac{2C_{ar}l_r + mr_{eff}\dot{\omega}_w l_f}{I_z\dot{x}} & \frac{-2C_{ar}l_r^2 + mr_{eff}\dot{\omega}_w l_f^2}{I_z\dot{x}} \end{bmatrix}\begin{bmatrix} \dot{y} \\ \dot{\Psi} \end{bmatrix}$$

$$\begin{bmatrix} a\left\{-\frac{(2C_{af} + mr_{eff}\dot{\omega}_w)s}{2C_{af}mt}\right\} \\ -a\left\{\frac{(2C_{af}l_f + mr_{eff}\dot{\omega}_w l_f)s}{2C_{af}I_z t} + \frac{D}{2I_z}\right\} - (1-a)\frac{D}{2I_z} \end{bmatrix}[\Delta F_x]$$

Here, $\dot{\Psi}$ is a desired yaw rate (a control target), $\Delta F_x$ is a differential force (a control input), $C_{af}$ and Car are stiffnesses, m is a vehicle mass, $I_z$ is a cornering stiffness, $x(V_x)$ is a vehicle speed, $r_{eff}$ is a turning radius, $\omega_W$ is an angular acceleration, and D is a vehicle width.

The target yaw moment may be changed according to the target steering angle input through the target steering angle input unit 10.

One-Side Brake Force Calculation Step S30

When the target moment of the vehicle is calculated at step S20, the integrated ECU 20 calculates the amount of one-side brake force required for the front and rear wheels on one side of the vehicle. For example, the amount of the one-side brake force may be calculated using Equation 2 below.

one-side brake force=vehicle target moment/(vehicle width/2)    [Equation 2]

As illustrated in FIGS. 4 and 5, the vehicle width is a distance D between the centers of two wheels constituting the front or rear wheels, but not limited thereto.

The one-side brake force applied to the vehicle may be changed depending on the target moment of the vehicle.

Total Brake Pressure Calculation Step (S40)

When the one-side brake force is calculated according to the target moment of the vehicle at step S30, the integrated ECU 20 may calculate the total brake pressure that are applied to the front and rear wheels on one side of the vehicle in order to obtain the calculated one-side brake force using the Equation 3 below.

total brake pressure=one-side brake force/(front wheel torque factor+rear wheel torque factor)    [Equation 3]

The torque factors of the front and rear wheels may be calculated by Equation 4 below.

torque factor=friction coefficient×(pressure/A)×R× number of pistons×number of wheels    [Equation 4]

Here, the friction coefficient is a friction coefficient of a brake pad, the pressure is a pressure of a piston pressing the brake pad, the area A is an area of the piston pressing the brake pad, R is an effective radius of a disc, and the number of pistons is the number of pistons that pressurize the brake pad, and the number of wheels is the number of wheels constituting the front and rear wheels. Examples of elements for calculating the torque factor are illustrated in FIG. 6.

Since the friction coefficient of the brake pad, the area of the piston pressing the brake pad, the effective radius of the disc, the number of pistons, and the number of wheels are not substantially changed while the vehicle travels, the torque factors of the front and rear wheels can be influenced by the pressure of the piston applied to the brake pad. That is, a change in torque factor may be achieved through a change in pressure of the piston during the traveling of the vehicle.

Front and Rear Wheel Brake Torque Calculation Step (S50)

When the total brake pressure is calculated at step S40, the integrated ECU 20 may calculate the front wheel brake torque acting on the front wheel and the rear wheel brake torque acting on the rear wheel through Equation 5 below.

front wheel brake torque=total brake pressure×front wheel torque factor    [Equation 5]

rear wheel brake torque=total brake pressure×rear wheel torque factor

As described in Equations 1 to 5, the brake torques acting on the front and rear wheels may be determined according to the pressures of the piston applied to the front and rear wheels corresponding to the target moment of the vehicle calculated according to the target steering angle input through the target steering angle input unit 10.

Step for Setting Pressure Limit Value of Rear Wheel (S60)

When the one-side brake force is applied to the vehicle, a moment may be generated in the vehicle thereby rotating the vehicle, but a pitch phenomenon (e.g. a phenomenon in which the center of gravity leans forward) may also occur, therefore a wheel slip on the rear wheel may occur faster than the front wheel. Therefore, even when the brake force to the rear wheel is applied after the slip phenomenon occurs, the brake force to the rear wheel may not have an effective effect on the braking of the vehicle. That is, the application of the brake force to the rear wheel is effective only before the slip phenomenon occurs, and the effectiveness of the application of the brake force to the rear wheel decreases thereafter. Therefore, it is necessary to prevent slipping and unnecessary brake force from being applied to the rear wheel by limiting the brake pressure applied to the rear wheel at a specific pressure.

The limit pressure value for limiting the brake pressure to the rear wheel may be preset or automatically set in the process of starting braking and monitoring the process of occurrence of slip of the rear wheel. For example, in the process of traveling at a speed of 60 to 80 kph on a dry asphalt road surface, the pressure applied to the rear wheel may be automatically set to the limit pressure value in a state immediately before slip occurs in the rear wheel after braking starts.

As described above, the limit pressure value of the rear wheel may be set automatically while monitoring the braking operation process at a specific road surface and speed, or a setter may set a specific value arbitrarily.

Front/Rear Wheel Brake Torque Distribution Step (S70)

When the front wheel brake torque and the rear wheel brake torque are set through Equation 5 above, the brake pressure is applied to the front and rear wheels respectively according to the set brake torque. In this case, it is preferable to set the one-side brake torque of the front and rear wheels such that the brake pressures applied to the front and rear wheels are the same until the situation before the pressure on the rear wheel reaches the limit pressure value. Therefore, by applying equal brake pressures to the front and rear wheels until the slip occurs in the rear wheels, the vehicle body can be stably emergency-steered.

When the brake pressure applied to the rear wheel reaches the limit pressure value, the one-side brake torque of the front wheels can be set such that additional brake pressure, that is, additional one-side brake force, is added or generated only by the brake torque of the front wheels.

Meanwhile, when a brake pressure greater than the maximum brake pressure that can be applied to the front wheels is required, since the additional one-side brake torque cannot be added or generated by the front wheels, by increasing the limit pressure values of the rear wheels, additional brake pressure is applied to the rear wheels. Even when additional brake pressure is applied to the rear wheel, in a case where a slip phenomenon occurs in the rear wheel, the effectiveness may decrease. However, even when a pressure limit value is set for the rear wheel, a slip phenomenon may occur in a state in which the limit pressure value is exceeded depending on road surface conditions or the like. In this case, the additional brake pressure may be effective from the pressure limit until just before the slip phenomenon occurs.

Figure 7:
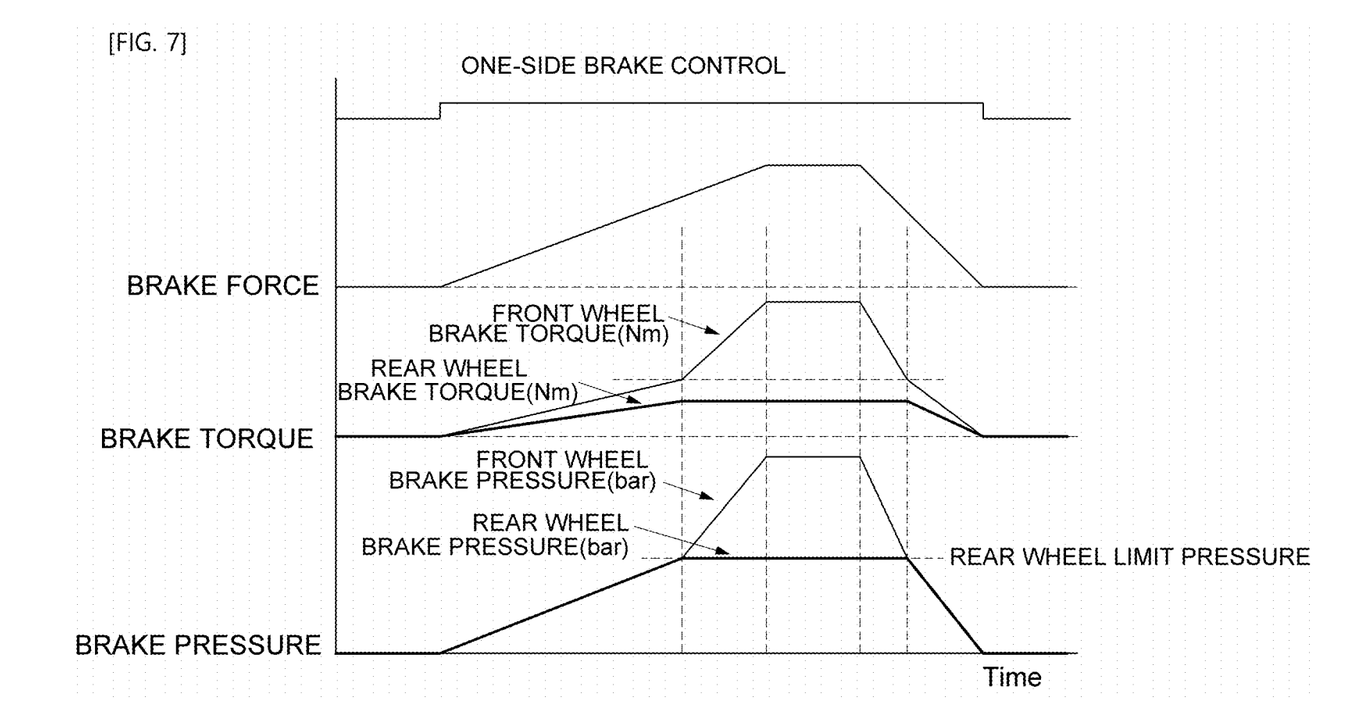
FIG. 7 are graphs for illustrating a brake pressure, a brake torque, a one-side brake force, and a one-side brake applied to front and rear wheels according to an embodiment of the present disclosure.

FIG. 7 are graphs illustrating a brake pressure, a brake torque, an one-side brake pressure according to one-side brake applied to front and rear wheels according to an embodiment of the present disclosure.

The top graph of FIG. 7 illustrates a specific time period in which the one-side brake control is performed, the bottom graph of FIG. 7 for a brake pressure illustrates changes in the brake pressure applied to the front and rear wheels respectively during the one-side brake control, the third graph of FIG. 7 for a brake pressure illustrates the change in the brake torque set for each of the front and rear wheels during the one-side brake control, and the second graph of FIG. 7 for a brake force illustrates the change in total brake force acting on both the front and rear wheels.

At the beginning of braking, the brake pressures applied to the front and rear wheels increase equally at the same rate. However, when the brake pressure of the rear wheels reaches the pressure limit, only the brake pressure corresponding to the limit pressure is applied to the rear wheels, while the brake pressure of the front wheels increases and additional brake pressure is applied to the front wheels. In the latter stage of the braking, the brake pressure applied to the front and rear wheels gradually decreases, and when the brake pressure falls below the pressure limit, the brake pressures applied to the front and rear wheels become the same.

In the process of changing the brake pressure in the front/rear wheels, the change in brake torque is also made. As described above, since the pitch phenomenon in which the center of gravity of the vehicle body moves forward occurs during the braking, it is desirable to set the brake force applied to the rear wheels to be smaller than the brake force applied to the front wheels. Therefore, it is desirable that the brake torque of the rear wheel is set lower than that of the front wheel. For this reason, the brake torque of the rear wheel is set lower than that of the front wheel in the graph of FIG. 7 according to an embodiment of the present disclosure.

Figure 8:
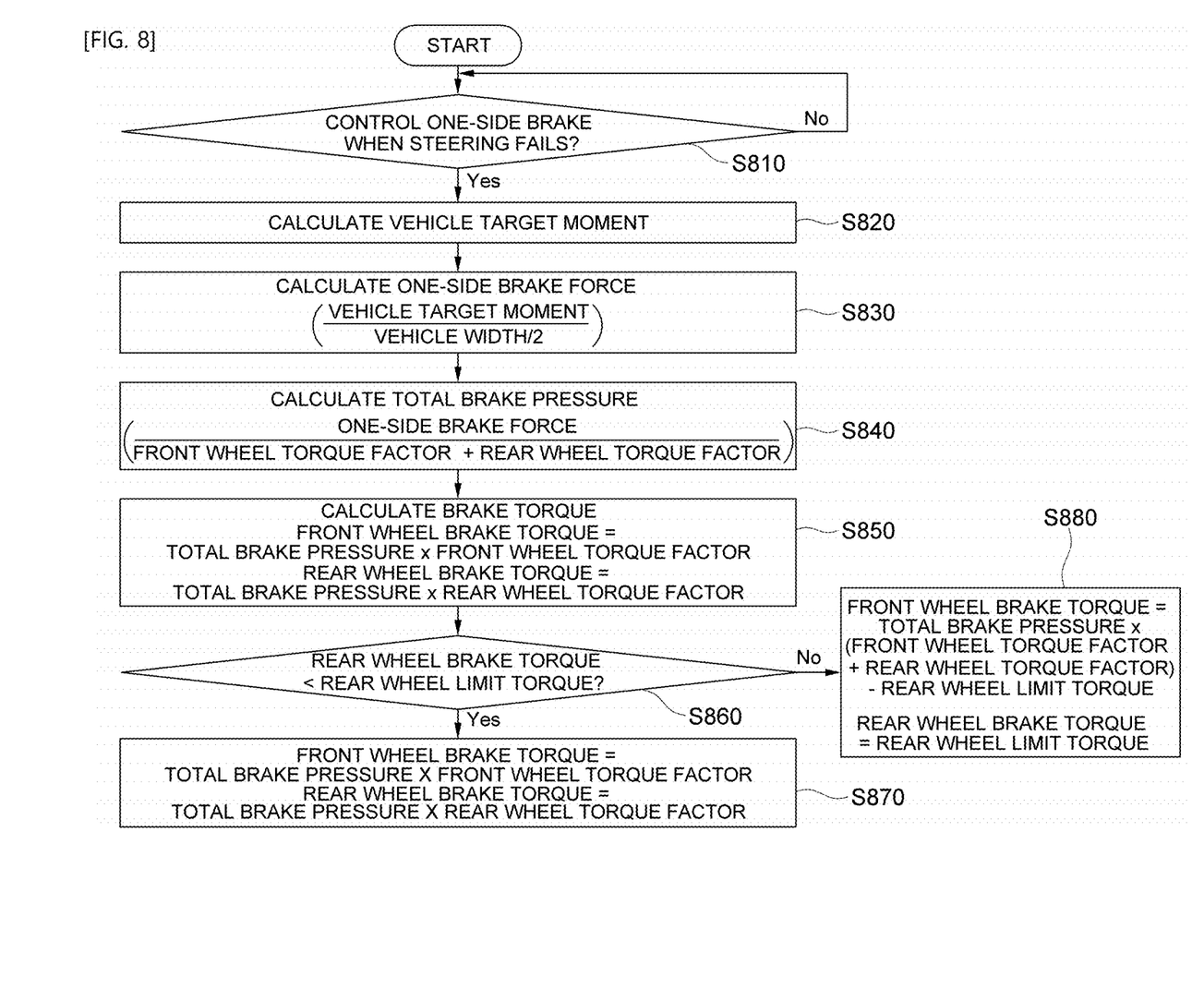
FIG. 8 is a flowchart for illustrating a method of controlling one-side brake using a one-side brake control system using distribution of torques between front and rear wheels according to an embodiment of the present disclosure.

FIG. 8 is a flowchart for illustrating a method of controlling one-side brake using the distribution of torques between front and rear wheels according to an embodiment of the present disclosure.

When the target steering angle for emergency steering is input through the target steering angle input unit 10 from the driver or autonomous vehicle controller due to the failure, malfunction or abnormality of the steering system 1, the integrated ECU 20 determines that one-side brake control is necessary (e.g. Yes at step S810). However, when the target steering angle is not input to the target steering angle input unit 10, it is determined that one-side brake control is not necessary and one-side brake control does not proceed (e.g. No at step S810).

When the target steering angle is input to the target steering angle input unit 10, the target yaw moment of the vehicle is calculated (step S820). At step S820, according to the input target steering angle, a steering angle of which the vehicle should turn is determined.

When the target moment of the vehicle is calculated at step S820, the one-side brake force applied to both the front and rear wheels can be calculated (step S830), and the total brake pressure is calculated using the calculated one-side brake force value and the front/rear wheel torque factor (step S840).

When the total brake pressure is calculated at step S840, the brake torque distributed to each of the front and rear wheels is calculated respectively (step S850). As described above, the pressure limit can be set to a brake associated with a rear wheel as a specific pressure.

After the front and rear wheel brake torques are calculated at step S850, a step S860 of comparing the rear wheel brake torque (a sensed or actual brake torque of the rear wheel) and the rear wheel limit torque (a brake torque of the rear wheel at the time when the pressure limit of the rear wheel is applied) is performed.

When the rear wheel brake torque is smaller than the rear wheel limit torque (e.g. Yes at step S860), the front wheel brake torque and the rear wheel brake torque calculated by Equation 5 above are actually distributed and applied to the front and rear wheels (step S870).

When the rear wheel brake torque is greater than or equal to the rear wheel limit torque (e.g. No at step S860), the brake torque applied to the rear wheel is set as the rear wheel limit torque (Equation 6 below), and the front wheel brake torque is set by subtracting the rear wheel limit torque from the sum of the calculated brake torque and the rear wheel brake torque. (Equation 7 below) (step S880).

rear wheel brake torque=rear wheel limit torque [Equation 6]

front wheel brake torque=total brake pressure×(front wheel torque factor+rear wheel torque factor)−rear wheel limit torque [Equation 7]

When the brake torque distributed to the front and rear wheels is determined through the above steps, the operation of the braking actuator 40 provided on one side of the vehicle is controlled by the braking ECU 30 according to the determined torque value, and one-side brake is performed on the front/rear wheels on one side of the vehicle.

As described above, the one-side brake control system and one-side brake control method using front and rear wheel torque distribution according to the preferred embodiment of the present disclosure have been described in detail with reference to the accompanying drawings, but the present disclosure is not limited to the above-described embodiment, and may be variously modified and implemented within the scope of the claims.

| [Detailed Description of Main Elements] | |
|---|---|
| 10: target steering angle input unit | 20: integrated ECU |
| 30: braking ECU | 40: braking actuator |

What is claimed is:

1. A one-side brake control system comprising:
one or more processors; and
memory configured to store instructions that, when executed by the one or more processors, cause the one or more processors to perform operations that include:
receiving a target steering angle of the vehicle when a steering system configured to steer a vehicle fails;
calculating a target moment of the vehicle based on the target steering angle and calculating brake torques of a one-side front wheel and a one-side rear wheel of the vehicle based on the target moment of the vehicle to distribute the brake torques between the one-side front wheel and the one-side rear wheel when the steering system fails; and
controlling one or more braking actuators of the one-side front wheel and the one-side rear wheel of the vehicle to perform one-side brake according to the calculated brake torques of the one-side front wheel and the one-side rear wheel.

2. The one-side brake control system of claim 1, wherein the one or more processors are configured to control the one-side rear wheel such that a brake pressure of the one-side rear wheel is limited to a specific pressure limit.

3. The one-side brake control system of claim 2, wherein the one or more processors are configured to, when the brake pressure of the one-side rear wheel reaches the specific pressure limit, control the one-side front wheel such that an additional one-side brake force is generated by the brake torque of the one-side front wheel only.

4. The one-side brake control system of claim 2, wherein the one or more processors are configured to, when the brake pressure of the one-side rear wheel is below the specific pressure limit, set the brake torque of the one-side rear wheel to be smaller than the brake torque of the one-side front wheel and set the brake pressure of the one-side rear wheel and a brake pressure of the one-side front wheel to be identical to each other.

5. The one-side brake control system of claim 2, wherein the one or more processors are configured to, when a one-side brake torque larger than a maximum pressure of the one-side front wheel is required when the brake pressure of the one-side rear wheel reaches the specific pressure limit, increase the specific pressure limit of the one-side rear wheel.

6. The one-side brake control system of claim 1, wherein the one or more processors are configured to receive a signal indicating that the steering system fails from a electronic control unit (ECU) of the steering system or determine that the steering system fails based on disconnection of communication with the ECU of the steering system.

7. The one-side brake control system of claim 2, wherein the one or more processors are configured to set the specific pressure limit of the one-side rear wheel to a brake pressure applied to the rear wheel immediately before slip in the one-side rear wheel occurs after braking is applied.

8. The one-side brake control system of claim 7, wherein the one or more processors are configured to automatically set the specific pressure limit of the one-side rear wheel by monitoring the braking and the slip in the one-side rear wheel.

9. The one-side brake control system of claim 2, wherein the one or more processors are configured to arbitrarily set the specific pressure limit of the one-side rear wheel.

10. The one-side brake control system of claim 1, wherein the one or more processors are configured to calculate a one-side brake force using the calculated target moment of the vehicle, calculate a total brake pressure using the one-side brake force and front and rear wheel torque factors, and calculate the brake torques of the one-side front wheel and the one-side of rear wheel using the total brake pressure and the front and rear wheel torque factors.

11. A one-side brake control method comprising:
receiving a target steering angle of the vehicle when a steering system configured to steer a vehicle fails;
calculating a target moment of the vehicle based on the target steering angle;
calculating brake torques of a one-side front wheel and a one-side rear wheel of the vehicle based on the target moment of the vehicle to distribute the brake torques between the one-side front wheel and the one-side rear wheel when the steering system fails; and
controlling one or more braking actuators of the one-side front wheel and the one-side rear wheel of the vehicle to perform one-side brake according to the calculated brake torques of the one-side front wheel and the one-side rear wheel.

12. The one-side brake control method of claim 11, further comprising:
determining whether the one-side brake is to be performed when the steering system fails;
calculating the target moment of the vehicle when it is determined that the one-side brake is to be performed;
calculating a one-side brake force;
calculating a total brake pressure of the vehicle;
calculating the brake torques of the one-side front wheel and the one-side rear wheel; and
distributing the brake torques to the one-side front wheel and the one-side rear wheel.

13. The one-side brake control method of claim 12, further comprising setting a pressure limit of the one-side rear wheel before the distributing of the brake torques to the one-side front wheel and the one-side rear wheel.

14. The one-side brake control method of claim 12, wherein the determining of whether the one-side brake is to be performed when the steering system fails comprises:
determining whether the steering system fails based on determination of whether a failure signal indicating that the steering system fails is transmitted from an ECU of the steering system or whether communication with the ECU of the steering system is disconnected, and
determining whether the one-side brake control is to be performed based on whether the target steering angle of the vehicle is received.

15. The one-side brake control method of claim 13, wherein the calculating of the one-side brake force comprises calculating the one-side brake force using an equation:

'one-side brake force'='vehicle target moment'/('vehicle width'/2), where 'one-side brake force' is the one-side brake force, 'vehicle target moment' is the target moment of the vehicle, and 'vehicle width' is a width of the vehicle.

16. The one-side brake control method of claim 15, wherein the calculating of the total brake pressure comprises calculating the total brake pressure of the vehicle using an equation:

'total brake pressure'='one-side brake force'/('front wheel torque factor'+'rear wheel torque factor'), where 'total brake pressure' is the total brake pressure of the vehicle, 'one-side brake force' is the one-side brake force, 'front wheel torque factor' is a torque factor of the one-side front wheel, and 'rear wheel torque factor' is a torque factor of the one-side rear wheel.

17. The one-side brake control method of claim 16, wherein the torque factor of the one-side front wheel and the torque factor of the one-side rear wheel are calculated using an equation:

'torque factor'=friction coefficient×('pressure'/$A$)×$R$× 'number of pistons'×'number of wheels', where 'torque factor' is the torque factor of the one-side front wheel or the torque factor of the one-side rear wheel, 'friction coefficient' is a friction coefficient of a brake pad, 'pressure' is a pressure of a piston pressing the brake pad, A is an area of the piston pressing the brake pad, R is an effective radius of a disc, 'number of pistons' is a number of pistons that pressurize the brake pad, and 'number of wheels' is a number of wheels constituting front or rear wheels of the vehicle.

18. The one-side brake control method of claim 17, wherein the calculating of the brake torques of the one-side front wheel and the one-side rear wheel comprises calculating the brake torques of the one-side front wheel and the one-side rear wheel using equations:

'front wheel brake torque'='total brake pressure'× 'front wheel torque factor'; and 'rear wheel brake torque=total brake pressure×rear wheel torque factor', where 'front wheel brake torque' is the brake torque of the one-side front wheel, 'rear wheel brake torque' is the brake torque of the one-side rear wheel, 'total brake pressure' is the total brake pressure of the vehicle, 'front wheel torque factor' is the torque factor of the one-side front wheel, and 'rear wheel torque factor' is the torque factor of the one-side rear wheel.

19. The one-side brake control method of claim 18, wherein the distributing of the brake torques to the one-side front wheel and the one-side rear wheel includes comparing the brake torque of the one-side rear wheel and the set pressure limit of the one-side rear wheel.

20. The one-side brake control method of claim 19, wherein the distributing of the brake torques to the one-side front wheel and the one-side rear wheel comprises, when the brake torque of the one-side rear wheel is smaller than the set pressure limit of the one-side rear wheel, setting the brake torque of the one-side rear wheel applied to the one-side rear wheels to a value obtained by multiplying the total brake pressure of the vehicle by the torque factor of the one-side rear wheel.

\* \* \* \* \*